US007587709B2

(12) United States Patent
Chilimbi et al.

(10) Patent No.: US 7,587,709 B2
(45) Date of Patent: *Sep. 8, 2009

(54) ADAPTIVE INSTRUMENTATION RUNTIME MONITORING AND ANALYSIS

(75) Inventors: Trishul Chilimbi, Seattle, WA (US); Matthias Hauswirth, Boulder, CO (US)

(73) Assignee: Microsoft Corporation, Redmond, WA (US)

( * ) Notice: Subject to any disclaimer, the term of this patent is extended or adjusted under 35 U.S.C. 154(b) by 539 days.

This patent is subject to a terminal disclaimer.

(21) Appl. No.: 10/693,834

(22) Filed: Oct. 24, 2003

(65) Prior Publication Data

US 2005/0091645 A1    Apr. 28, 2005

(51) Int. Cl.
*G06F 9/44* (2006.01)
(52) U.S. Cl. .................. 717/130; 717/128; 717/131
(58) Field of Classification Search .................. None
See application file for complete search history.

(56) References Cited

U.S. PATENT DOCUMENTS

| 5,220,667 | A  | 6/1993  | Ichieda |
| 5,333,311 | A  | 7/1994  | Whipple, II |
| 5,713,008 | A  | 1/1998  | Falkner |
| 5,740,443 | A  | 4/1998  | Carini |
| 5,774,685 | A  | 6/1998  | Dubey |
| 5,815,720 | A  | 9/1998  | Buzbee |
| 5,909,578 | A  | 6/1999  | Buzbee |
| 5,925,100 | A  | 7/1999  | Drewry et al. |
| 5,940,618 | A  | 8/1999  | Blandy et al. |
| 5,950,003 | A  | 9/1999  | Kaneshiro et al. |
| 5,950,007 | A  | 9/1999  | Nishiyama et al. |
| 5,953,524 | A  | 9/1999  | Meng et al. |
| 5,960,198 | A  | 9/1999  | Roediger et al. |
| 6,026,234 | A  | 2/2000  | Hanson et al. |
| 6,073,232 | A  | 6/2000  | Kroeker et al. |
| 6,079,032 | A  | 6/2000  | Peri |
| 6,148,437 | A  | 11/2000 | Shah et al. |
| 6,216,219 | B1 | 4/2001  | Cai et al. |
| 6,233,678 | B1 | 5/2001  | Bala |
| 6,311,260 | B1 | 10/2001 | Stone et al. |
| 6,321,240 | B1 | 11/2001 | Chilimbi et al. |
| 6,330,556 | B1 | 12/2001 | Chilimbi et al. |
| 6,360,361 | B1 | 3/2002  | Larus et al. |
| 6,370,684 | B1 | 4/2002  | De Pauw et al. |
| 6,404,455 | B1 | 6/2002  | Ito et al. |
| 6,560,693 | B1 | 5/2003  | Puzak et al. |
| 6,571,318 | B1 | 5/2003  | Sander et al. |

(Continued)

OTHER PUBLICATIONS

Zorn et a;., A Memory Allocation Profiler for C and Lisp Programs, Spur research, published Feb. 16, 1988, p. 1-18.*

(Continued)

*Primary Examiner*—Tuan Q Dam
*Assistant Examiner*—Zheng Wei
(74) *Attorney, Agent, or Firm*—Klarquist Sparkman, LLP

(57) ABSTRACT

Techniques described herein provide low-overhead adaptive instrumentation runtime monitoring and analysis of software. A method of instrumenting a program to provide instrumentation data creates instrumentation versions comprising duplicate versions of original procedures in the program with instrumentation code for capturing instrumentation data, and adaptively decreases the sampling rate of the instrumented version of a procedure as the frequency of execution of the procedure increases. Additionally, the instrumentation methods can be used to build runtime tools that monitor the correctness of a program with very little overhead.

25 Claims, 6 Drawing Sheets

U.S. PATENT DOCUMENTS

| | | | |
|---|---|---|---|
| 6,598,141 | B1 | 7/2003 | Dussud et al. |
| 6,628,835 | B1 | 9/2003 | Brill et al. |
| 6,651,243 | B1 | 11/2003 | Berry et al. |
| 6,658,652 | B1 * | 12/2003 | Alexander et al. .......... 717/128 |
| 6,675,374 | B2 | 1/2004 | Pieper et al. |
| 6,704,860 | B1 | 3/2004 | Moore |
| 6,848,029 | B2 | 1/2005 | Coldewey |
| 6,886,167 | B1 | 4/2005 | Breslau et al. |
| 6,951,015 | B2 | 9/2005 | Thompson |
| 7,032,217 | B2 * | 4/2006 | Wu ........................... 717/158 |
| 7,181,730 | B2 | 2/2007 | Pitsianis et al. |
| 2002/0133639 | A1 | 9/2002 | Breslau et al. |
| 2002/0144245 | A1 | 10/2002 | Lueh |
| 2003/0145314 | A1 | 7/2003 | Nguyen et al. |
| 2004/0015897 | A1 | 1/2004 | Thompson et al. |
| 2004/0015930 | A1 | 1/2004 | Wu |
| 2004/0025145 | A1 | 2/2004 | Dawson |
| 2004/0088699 | A1 | 5/2004 | Suresh |
| 2004/0103401 | A1 | 5/2004 | Chilimbi et al. |
| 2004/0103408 | A1 | 5/2004 | Chilimbi et al. |
| 2004/0111444 | A1 | 6/2004 | Garthwaite |
| 2004/0133556 | A1 | 7/2004 | Wolczko et al. |
| 2004/0215880 | A1 | 10/2004 | Chilimbi et al. |
| 2004/0216091 | A1 | 10/2004 | Groeschel |
| 2005/0246696 | A1 | 11/2005 | Alexander et al. |

OTHER PUBLICATIONS

U.S. Appl. No. 11/134,812, filed May 20, 2005, Ganapathy et al.
U.S. Appl. No. 11/134,796, filed May 20, 2005, Shankar et al.
U.S. Appl. No. 11/115,924, filed Apr. 26, 2005, Chilimbi et al.
Ammons et al., "Exploiting Hardware Performance Counters with Flow and Context Sensitive Profiling", PLDI (Jun. 1997), 12 pages.
Ammons et al., "Improving Data-Flow Analysis with Path Profiles," *SIGPLAN '98* (1998), pp. 72-84.
Anderson et al., "Continuous Profiling: Where Have All the Cycles Gone?", ACM (Nov. 1997), pp. 357-390.
Annavaram et al., "Data Prefetching by Dependence Graph Precomputation", IEEE (2001), pp. 52-61.
Balakrishnan et al., "Analyzing Memory Accesses in χ86 Binary Executables", *Proc. 13th Intl. Conference on Compiler Construction*, LNCS 2985 (Apr. 2004), pp. 5-23.
Ball et al., "Efficient Path Profiling", IEEE (1996), pp. 46-57.
Berger et al., "Composing High-Performance Memory Allocators", ACM (2001), 11 pages.
Bush et al., "A Static Analyzer for Finding Dynamic Programming Errors", *Software: Practice and Experience* (2000), pp. 775-802.
Cahoon et al., "Data Flow Analysis for Software Prefetching Linked Data Structures in Java", IEEE (2001), 12 pages.
Calder et al., "Cache-Conscious Data Placement", ACM (1998), 11 pages.
Chen et al., "Reducing Memory Latency via Non-Blocking and Prefetching Caches", ACM (1992), pp. 51-61.
Chilimbi et al., "Cache-Conscious Structure Definition", *Proceedings of the ACM SIGPLAN '99* (May 1999), 12 pages.
Chilimbi et al., "Cache-Conscious Structure Layout", *Proc. ACM SIGPLAN '99 Conf. on Programming Language Design and Impl.*, (May 1999), 12 pages.
Chilimbi et al., "Dynamic Hot Data Stream Prefetching for General-Purpose Programs", ACM (2002), 11 pages.
Chilimbi, "Efficient Representations and Abstractions for Quantifying and Exploiting Data Reference Locality", ACM (2001), pp. 191-202.
Chilimbi et al., "Low-Overhead Memory Leak Detection Using Adaptive Statistical Profiling", *Proc. 11th Intl. Conference on Architectural Support for Programming Language and Operating Systems (ASPLOS)*, (Oct. 2004), pp. 156-164.
Chilimbi et al., "On the Stability of Temporal Data Reference Profiles", Pact (Sep. 2001), 10 pages.
Chilimbi et al., "Using Generational Garbage Collection to Implement Cache-Conscious Data Placement", *Proceedings of the First International Symposium on Memory Management* (Oct. 1998), vol. 34(3), pp. 37-48.
Cooksey et al., "A Stateless, Content-Directed Data Prefetching Mechanism", ACM (2002), pp. 279-290.
Crescenzi at al., "A Compendium of NP Optimization Problems," [Downloaded from the World Wide Web on Dec. 12, 2003], 20 pages.
Dean et al., "*ProfileMe*: Hardware Support for Instruction-Level Profiling on Out-of-Order Processors", *Proc. 30th Annual Intl. Symp. On Microarchitecture* (Dec. 1997), 12 pages.
Deaver et al., "Wiggins/Redstone: An On-line Program Specializer", *Proceedings of the IEEE Hot Chips XI Conference* (Aug. 1999), 29 pages.
Demsky et al., "Automatic Detection and Repair of Errors in Data Structures", *Proceedings of 18th ACM SIGPLAN Conference on Object-Oriented Programming Systems, Language and Applications (OOPSLA)* (Oct. 2003), pp. 78-95.
Demsky et al., "Role-Based Exploration of Object-Oriented Programs", *Proceedings of 24th International Conference on Software Engineering (ISCE)* (May 2002), pp. 313- 334.
Dor et al., "Cleanness Checking of String Manipulations in C Programs via Integer Analysis", *Proc. 8th Int'l Static Analysis Symposium* (Jun. 2001), 19 pages.
Dor et al., "CSSV: Towards a Realistic Tool for Statically Detecting All Buffer Overflows in C", *PLDI'03* (Jun. 9-11, 2003), pp. 155-167.
Edwards, "Black-Box Testing Using Flowgraphs: An Experimental Assessment of Effectiveness and Automation Potential", *Software Testing, Verification and Reliability*, vol. 10, No. 4 (Dec. 2000), pp. 249-262.
Eeckhout et al., "Workload Design: Selecting Representative Program-Input Pairs", *Proceedings of the 2002 International Conference on Parallel Architectures and Compilation Techniques* (2002), 12 pages.
Ernst, "Dynamically Discovering Likely Program Invariants", *PhD Thesis, University of Washington* (Aug. 2000), pp. 1-127.
Evans et al., "Improving Security Using Extensible Lightweight Static Analysis", *IEEE Software* (Jan./Feb. 2002), pp. 42-51.
Evans et al., "LCLint: A Tool for Using Specifications to Check Code", *SIGSOFT Symposium on the Foundations of Software Engineering* (Dec. 1994), 10 pages.
Evans et al., "Splint Manual, Version 3.1.1-1", *Secure Programming Group, University of Virginia Department of Computer Science* (Jun. 5, 2003), 121 pages.
Evans, "Static Detection of Dynamic Memory Errors", *SIGPLAN Conf. on Programming Language and Design Implementation* (May 1996), 10 pages.
Evans, "Using Specifications to Check Source Code", *TR-628, MIT Lab for Computer Science* (Jun. 1994), 97 pages.
Foster et al., "A Theory of Type Qualifiers", *Proc. ACM SIGPLAN '99 Conf. on Programming Language and Design Implementation (PLDI)* (May 1999), 12 pages.
Gloy et al., "Procedure Placement Using Temporal-Ordering Information", *ACM Transactions on Programming Languages and System*, vol. 21 (1999), pp. 111-161.
Guyer et al., "An Annotation Language for Optimizing Software Libraries", *Proc. Second Conf. on Domain Specific Languages* (Oct. 1999), 14 pages.
Halldorsson, "Approximations of Weighted Independent Set and Hereditary Subset Problems", *JGAA*, vol. 4, No. 1 (Apr. 2000), pp. 1-16.
Hangal et al., "Tracking Down Software Bugs Using Automatic Anomaly Detection", *Proceedings of 22nd International Conference on Software Engineering (ICSE)* (Jan. 1992), pp. 125-136.
Harris, "Dynamic Adaptive Pre-tenuring", *Proceedings of the International Symposium on Memory Management* (Oct. 2000), 9 pages.
Heil et al., "Relational Profiling: Enabling Thread-Level Parallelism in Virtual Machines", *Proc. 33rd International Symposium on Microarchitecture* (Dec. 2000), pp. 1-10.
Hirzel et al., "Understanding the Connectivity of Heap Objects", *Proceedings of International Symposium on Memory Management (ISMM)* (Jun. 2002), pp. 143-156.

Horning, "The Larch Shared Language: Some Open Problems", *Compass/ADT Workshop* (Sep. 1995), 16 pages.
Joseph et al., "Prefetching Using Markov Predictors", ACM (1997), pp. 252-263.
Jouppi, "Improving Direct-Mapped Cache Performance by the Addition of a Small Fully-Associative Cache and Prefetch Buffers", IEEE (1990), pp. 364-373.
"JProfiler Manual," ejtechnologies, GmbH (2004), pp. 1-141.
Karlsson et al., "A Prefetching Technique for Irregular Accesses to Linked Data Structures", *Sixth International Symposium on High-Performance Computer Architecture* (Jan. 2000), 12 pages.
Khurshid et al., "An Analyzable Annotation Language," *OOPSLA '02* (Nov. 2002), 15 pages.
Kistler et al., "Automated Data-Member Layout of Heap Objects to Improve Memory-Hierarchy Performance," *ACM Transactions on Programming Language and Systems*, (2000), 16 pages.
Klaiber et al., "An Architecture for Software-Controlled Data Prefetching", ACM (1991), pp. 43-53.
Kramer, "Examples of Design by Contract in Java Using Contract, the Design by Contract™ Tool for Java™", *Object World Berlin '99, Design & Components* (May 17- 20, 1999), 26 pages.
Larochelle et al., "Statistically Detecting Likely Buffer Overflow Vulnerabilities", *2001 USENIX Security Symposium* (Aug. 2001), 5 pages.
Larus, "Whole Program Paths," *SIGPLAN '99 Conference on Programming Languages and Design* (1999), 11 pages.
Leavens et al., "Enhancing the Pre-and Postcondition Technique for More Expressive Specifications", *Proc. World Congress on Formal Methods in the Development of Computing Systems* (Sep. 1999), 21 pages.
Leavens et al., "Preliminary Design of JML", *Technical Report 98-06v, Iowa State University Department of Computer Science* (Jun. 1998-2003; revised May 2003), 94 pages.
Leino, "Checking Correctness Properties of Object-Oriented Programs," *Internet*, http://research.microsoft.com/leino/paper/1 (Aug. 19, 2002), 49 pages.
Luk et al., "Compiler-Based Prefetching for Recursive Data Structures", ACM (1996), pp. 222-233.
Melski et al., "Interprocedural Path Profiling", *University of Wisconsin* (1998), pp. 1-50.
Microsoft Corporation, "Scalable Program Analysis", *Internet*, http://research.microsoft.com/spa/ (downloaded on Sep. 5, 2003), 3 pages.
Mowry et al., "Design and Evaluation of a Compiler Algorithm for Prefetching", *ACM* (1992), pp. 62-73.
Mowry et al., "Predicting Data Cache Misses in Non-Numeric Applications Through Correlation Profiling", *International Symposium on Microarchitecture* (1997), 7 pages.
Nevill-Manning et al., "Identifying Hierarchical Structure in Sequences: a Linear-time Algorithm", *Journal of Artificial Intelligence Research* (1997), 7:67-82.
Petrank et al., "The Hardness of Cache Conscious Data Placement," *29th Annual ACM Symposium on Principles of Programming Languages* (2002), 33 pages.
Roth et al., "Dependence Based Prefetching for Linked Data Structures", *Proceedings of the 8th International Conference on Architectural Support* (Oct. 1998), pp. 115-126.
Roth et al., "Effective Jump-Pointer Prefetching for Linked Data Structures", *IEEE* (1999), pp. 111-121.
Rubin et al., "An Efficient Profile-Analysis Framework for Data-Layout Optimizations", *POPL* (Jan. 2002), pp. 140-153.
Saavedra et al., "Improving the Effectiveness of Software Prefetching With Adaptive Execution", *IEEE* (1996), pp. 68-78.
Sastry et al., "Rapid Profiling Via Stratified Sampling", *International Symposium on Computer Architecture* (2001), pp. 1-12.
Seidl et al., "Segregating Heap Objects by Reference Behavior and Lifetime", *8th Int'l Conf. on Architectural Support for Programming Languages and Operating Systems* (Oct. 1998), 12 pages.
Shaham, "Automatic Removal of Array Memory Leaks in Java", (1999), 12 pages.
Srivastava, "Atom: a System for Building Customized Program Analysis Tools", *SIGPLAN '94 Conf. on Programming Language Design and Impl.* (1994), 25 pages.
Stoutchinin et al., "Speculative Prefetching of Induction Pointers", *Proceedings of 10th International Conference on Compiler Construction* (2001), 15 pages.
"Technologies for Measuring Software Performance", *Intel Corporation* (2003), 4 pages.
Truong et al., "Improving Cache Behavior of Dynamically Allocated Data Structures", *Pact* (1998), 8 pages.
Vanderwiel et al., "Data Prefetch Mechanisms", *ACM Computing Surveys*, vol. 32, No. 2 (Jun. 2000), pp. 174-199.
Wahls et al., "The Direct Execution of SPECS-C++: A Model-Based Specification Language for C++ Classes", *Technical Report TR94-02b, Iowa State University Department of Computer Science* (Nov. 18, 1994), 52 pages.
Zhou et al., "AccMon: Automatically Detecting Memory-Related Bugs via Program Counter-Based Invariants," *Proceedings of 37th International Symposium on Micro-Architecture (Micro)* (Dec. 2004).
Zilles et al., "A Programmable Co-processor for Profiling", *Proceedings of the 7th International Symposium on High Performance Architecture* (Jan. 2001), 12 pages.
Chilimbi and Hirzel, "Bursty tracing: a framework for low-overhead temporal profiling," in *Workshop on Feedback-Directed and Dynamic Optimizations (FDDO)* (2001).
Savage et al., "Eraser: a dynamic data race detector for multithreaded programs." In *ACM Transactions on ComputerSystems (TOCS)* (1997).
Srivastava et al., "Vulcan: binary transformation in a distributed environment," in *Microsoft Research Tech Report, MSR-TR-2001-50* (2001), available at http://research.microsoft.com/research/pubs/view.aspx?msr_tr_id=MSR-TR-2001-50.
Arnold and Ryder, "A framework for reducing the cost of instrumented code," *Programming Languages Design and Implementation (PLDI)* (2001).
Hastings and Joyce "Purify: fast detection of memory leaks and access errors," *Proceedings of the Winter 1992 USENIX Conference*, pp. 125-138 (1992).
Hollingsworth et al., "MDL: a language and compiler for dynamic program instrumentation," Proc. of the International Conference on Parallel Architectures and Compilations Techniques (Nov. 1997).
Cowan et al., "Buffer overflows: attacks and defenses for the vulnerability of the decade," *DARPA information survivability conference and expo (DISCEX)* (2000).
Traub et al., "Ephemeral instrumentation for lightweight program profiling," *Technical report*, Harvard University (1999).
Bala et al., "Dynamo: a transparent dynamic optimization system," *In SIGPLAN 2000 Conference on Programming Language Design and Implementation* (Jun. 2000).
Duesterwald and Bala, "Software profiling for hot path prediction: Less is more," In *Ninth International Conference on Architectural Support for Programming Languages and Operating Systems* (Nov. 2000).
Hölzle and Ungar, "Reconciling responsiveness with performance in pure object-oriented languages," *ACM Transactions on Programming Languages and Systems* 18(4):355-400 (Jul. 1996).
English et al., "Loge: a self-organizing disk controller," *Proc. USENIX Winter 1992 Tech. Conf.*, San Francisco, pp. 237-251 (Jan. 1992).
Griffioen et al., "Reducing File System Latency Using a Predictive Approach," 11 pp. (no date).
Hatfield et al., "Program Restructuring for Virtual Memory," *IBM Sys. J.*, No. 3, pp. 168-192 (1971).
Kroeger et al., "Predicting Future File-system Actions from Prior Events," *Proc. USENIX Annual Tech. Conf.*, San Diego, pp. 1-10 (Jan. 1996).
Palmer et al., "Fido: A Cache that Learns to Fetch," *Proc. 17th Int'l Conf. on Very Large Databases*, Barcelona, pp. 255-264 (Sep. 1991).
Patterson et al., "Informed Prefetching and Caching," *Proc. 15th ACM Symp. on Operating System Principles*, Copper Mountain Resort, CO, pp. 79-95 (Dec. 1995).
Staelin et al., "Smart Filesystems," *Proc. USENIX—Winter '91*, Dallas, TX, pp. 45-51 (1991).
Tait et al., "Detection and Exploitation of File Working Sets," *IEEE*, pp. 2-9 (1991).

Diwan et al., "Memory-System Performance of Programs with Intensive Heap Allocation," ACM TOCS vol. 13, Issue 3, Aug. 1995, ISSN: 0734-2071.

Cifuentes, "Structuring Decompiled Graphs," Technical Report May 1994, Faculty of Information Technology, Queensland University of Technology, GPO Box 2434, Brisbane 4001, Australia (Apr. 1994), 15 pages.

Hauck, "Configuration Prefetch for Single Context Reconfigurable Coprocessors," In Proceedings of the ACM/SIGDA International Symposium on Field Programmable Gate Arrays (Feb. 1998), pp. 65-74.

Ung et al., "Optimising Hot Paths in a Dynamic Binary Translator," In Workshop on Binary Translation, Oct. 2000, pp. 55-65.

\* cited by examiner

Runtime Monitoring Software 680

ADAPTIVE INSTRUMENTATION RUNTIME MONITORING AND ANALYSIS

TECHNICAL FIELD

The present invention relates to program instrumentation for run-time software monitoring and analysis.

BACKGROUND

Static checking for program correctness, while currently an area of great promise and ongoing investigation, is fundamentally unable to detect large classes of program defects that are nevertheless very important. Software testing addresses these shortcomings but is expensive and limited by the scenarios used, and the amount of testers and time allotted. Consequently, software continues to ship with latent bugs, which can compromise system security in addition to affecting reliability. Furthermore, even "correct" software can violate a higher-level security policy. Given this, a pragmatic approach is to self-monitor application execution and report encountered defects.

One method for finding latent software defects is runtime monitoring. Runtime monitoring of an executing program can identify many program defects that static checking may miss, such as memory leaks, data races, and invariance. Runtime monitoring can be implemented by instrumenting code. Instrumentation refers to the process of adding code to software that monitors and collects data regarding memory management and other details of the software at runtime. However, currently, the overhead added to the executing program can exceed 30%, a slowdown that users are likely to notice and software developers are unlikely to accept. One solution is burst sampling.

The sequence of all events occurring during execution of a program is generally referred to as the "trace." A "burst" on the other hand is a subsequence of the trace. Arnold and Ryder present a framework that samples bursts. (See, M. Arnold and B. Ryder, "A Framework For Reducing The Cost Of Instrumented Code," Programming Languages Design And Implementation (PLDI) (2001).) In their framework, the code of each procedure is duplicated. (Id., at FIG. 2.) Both versions of the code contain the original instructions, but only one version is instrumented to also collect profile information. The other version only contains checks at procedure entries and loop back-edges that decrement a counter "nCheck," which is initialized to "nCheck$_0$." Most of the time, the (non-instrumented) checking code is executed. Only when the nCheck counter reaches zero, a single intraprocedural acyclic path of the instrumented code is executed and nCheck is reset to nCheck$_0$.

A limitation of the Arnold-Ryder framework is that it stays in the instrumented code only for the time between two checks. Since it has checks at every procedure entry and loop back-edge, the framework captures a burst of only one acyclic intraprocedural path's worth of trace. In other words, only the burst between the procedure entry check and a next loop back-edge is captured. This limitation can fail to profile many longer "hot data stream" bursts, and thus fail to optimize such hot data streams. Consider for example the code fragment:

```
for (i=0; i<n; i++)
    if (...) f( );
    else g( );
```

Because the Arnold-Ryder framework ends burst profiling at loop back-edges, the framework would be unable to distinguish the traces fgfgfgfg and ffffgggg. For optimizing single-entry multiple-exit regions of programs, this profiling limitation may make the difference between executing optimized code most of the time or not.

Another limitation of the Arnold-Ryder framework is that the overhead of the framework can still be too high for dynamic optimization of machine executable code binaries. The Arnold-Ryder framework was implemented for a Java virtual machine execution environment, where the program is a set of Java class files. These Java programs typically have a higher execution overhead, so that the overhead of the instrumentation checks is smaller compared to a relatively slow executing program. The overhead of the Arnold-Ryder framework's instrumentation checks may make dynamic optimization with the framework impractical in other settings for programs with lower execution overhead (such as statically compiled machine code programs).

A framework that supports bursty tracing for low-overhead temporal profiling is described in Chilimbi, T. and Hirzel, M., "Bursty Tracing: A Framework for Low-Overhead Temporal Profiling," in *Workshop on Feedback-Directed and Dynamic Optimizations (FDDO)*, 2001; and Chilimbi, T. and Hirzel, M., "Dynamic Hot Data Stream Prefetching For General-Purpose Programs," in *PLDI '02*, Jun. 17-19, 2002. This bursty tracing framework adds a second counter (nInstr) that controls the length of execution in the instrumented version of the code. In this way, the bursty tracing framework can periodically capture complete program execution detail (i.e., a "trace sample") for short timeframes. Further, bursty tracing permits additional control and flexibility by allowing the "trace sample" extent to be configured in addition to collection frequency, by use of the two user-specified counters (nCheck and nInstr).

A drawback of the bursty tracing is that its sampling methodology may miss infrequently executed code paths that are nevertheless important for identifying reliability and/or security problems.

SUMMARY

A technique for bursty tracing with adaptive instrumentation provides improved low-overhead temporal profiling and analysis of software, with an emphasis on checking correctness of software rather that improving performance. The adaptive instrumentation addresses the shortcomings of the prior bursty tracing framework by adjusting the sampling rate of instrumented procedures according to their frequency of execution. For example, the technique can sample execution of code paths at a rate inversely proportional to their execution frequency. In this way, rarely executed code paths can be essentially always traced, whereas frequently executed code paths are sampled at a very low rate.

In accordance with one implementation of the technique described herein, a bursty profiling framework is extended by also placing a counter at each of one or more dispatch check points to track the frequency of execution of the code path. The sampling rate at which the respective dispatch check point diverts execution to an instrumented version of the code is then varied according to the frequency of execution of the code path as tracked by this counter. For example, the software may begin execution with each of the dispatch check points providing a 100% sampling rate, which is then gradually adjusted downward according to the execution count of the code path.

In accordance with a further technique described herein, the bursty tracing adaptive instrumentation framework is applied to detecting memory leaks in software. In particular, the sampling of bursty trace data obtained by this instrumentation framework during runtime monitoring is analyzed to determine all objects that satisfy a staleness predicate as memory leaks.

Additional features and advantages of the invention will be made apparent from the following detailed description of embodiments that proceeds with reference to the accompanying drawings.

DETAILED DESCRIPTION

The following description is directed to techniques and tools for bursty tracing with adaptive instrumentation for low-overhead, temporal profiling, which can be used in runtime monitoring and analysis of software. The techniques and tools can use a bursty tracing with adaptive instrumentation framework structured to comprise duplicate non-instrumented ("checking code") and instrumented code versions of at least some original procedures of the program.

Figure 1:
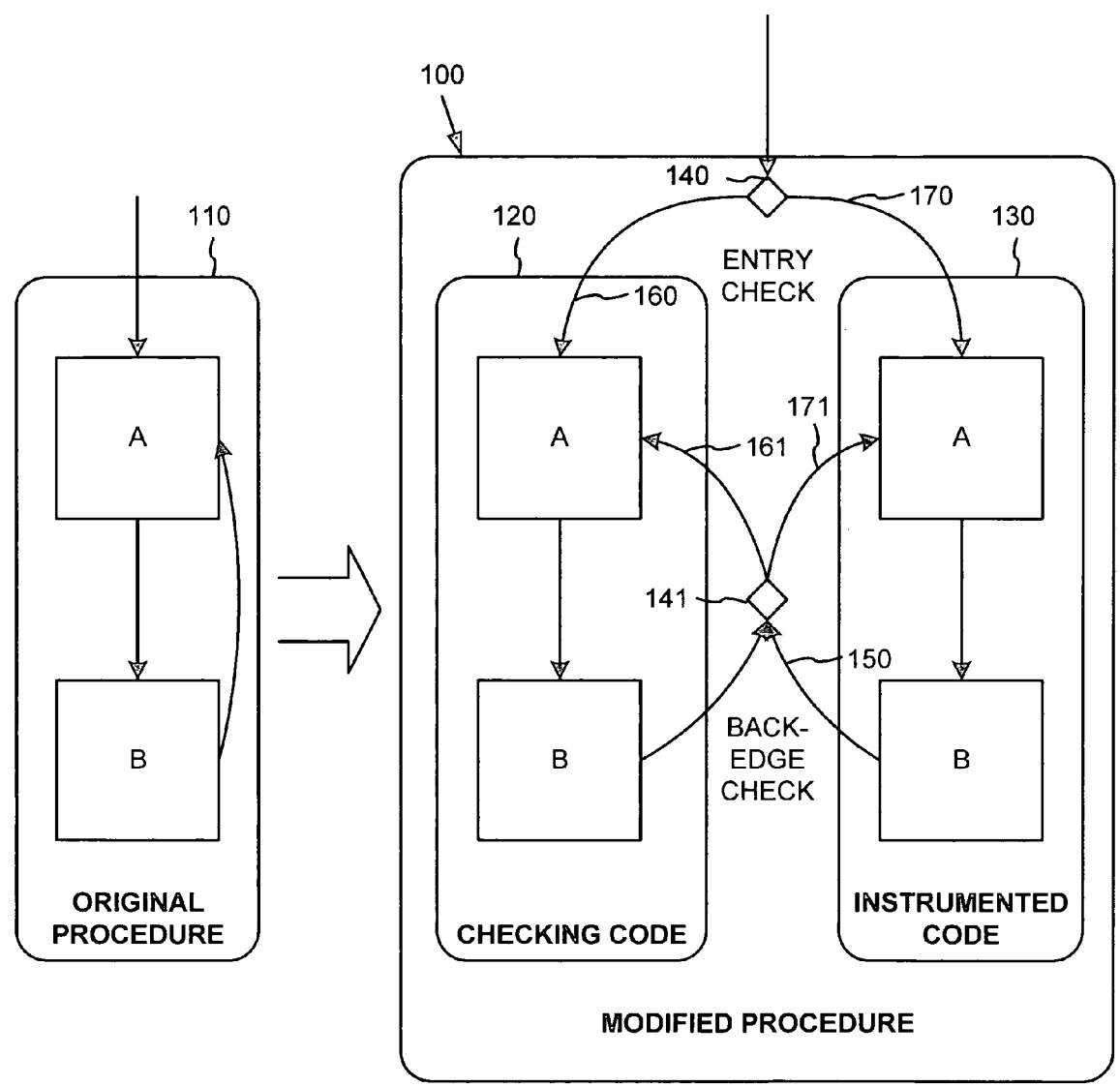
FIG. 1 is a block diagram of a program modified according to a bursty tracing framework.

A bursty tracing framework is described briefly in reference to FIG. 1. FIG. 1 is a block diagram of a program modified according to a bursty tracing framework 100. Original procedures 110 in the target software are duplicated such that a checking code (original code) 120 is produced along with an instrumented code 130. The instrumented code 130 can contain any number of instrumentation points. The framework 100 can comprise dispatch checks 140-141, which can be placed, for example, at procedure entry and loop back-edges. The dispatch checks are responsible for diverting control between the checking and instrumentation copies of the code based on counters relating to sample size (nInstr) and sampling period or rate (nCheck). Further details of the bursty tracing framework are provided in Trishul A. Chilimbi and Martin Hirzel, "Dynamic Temporal Optimization Framework," U.S. Pat. No. 7,140,008, which is hereby incorporated herein fully by reference.

While a bursty tracing framework captures temporal execution detail of frequently executed code paths, many program defects only manifest on rarely visited code regions that periodic bursty trace sampling alone is likely to miss. This shortcoming can be overcome by a variation of the bursty tracing framework that includes adaptive instrumentation, where a sampling rate at which bursty traces of the instrumented code are sampled is adapted to the frequency of execution of the respective code path.

In this bursty tracing with adaptive instrumentation, the framework maintains a per-dispatch check sampling rate rather than a global sampling rate. More specifically, a separate set of nCheck and nInstr counters are associated with each adaptive dispatch check. As in the bursty tracing framework, the nCheck counter for the adaptive dispatch check counts down a number of executions of the dispatch check that dispatch execution into the checking code. So long as the nCheck counter is non-zero, the dispatch check dispatches to the checking code 120. When the nCheck counter reaches zero, the nInstr counter is initialized to its initial value $nInstr_0$, and execution is dispatched into the instrumented version of the code 130. The nInstr counter counts down a number of executions dispatched to the instrumented code 130. When the nInstr counter again reaches zero, the nCheck counter is re-initialized to its initial value $nCheck_0$. The initial values $nCheck_0$ and $nInstr_0$ then determine the period between bursty trace samples and the length of the bursty trace, respectively. The sampling rate (r) is then given by $r = nInstr_0/(nCheck_0 + nInstr_0)$.

In bursty tracing with adaptive instrumentation, this sampling rate is adapted to the frequency of execution of the code path through the adaptive dispatch check. The more often the code path (i.e., the adaptive dispatch check) is executed, the more the sampling rate is decreased. In one implementation, all adaptive dispatch checks initially produce bursty trace samples at a rate at or near 100% (full tracing). More specifically, the nCheck counter is initialized at $nCheck_0=0$, so that the first time the code path is executed a bursty trace is sampled through the code path. (As described above, if the nCheck counter is zero when the dispatch check is executed, then execution is dispatched to the instrumented code.) This provides a sampling rate of $r = nInstr_0/(0 + nInstr_0) = 1$ (which is 100% execution of the instrumented code).

On subsequent executions of the adaptive dispatch check, the counter nCheck that controls the sampling period is adapted to decrease the sampling rate. On subsequent resets of the nCheck counter, the sampling rate is decremented (by increasing the initialization value $nCheck_0$ of the nCheck counter at reset) towards a pre-set lower bound. In this fashion, rarely used code is sampled at very high rates, whereas more frequently executed code is sampled at or near a much lower sampling rate. In other words, the adaptive dispatch checks of rarely used code paths have high sample rates, whereas those of more frequently executed code are varied to lower sampling rates.

For adapting the sampling rates of the adaptive dispatch checks, the bursty tracing with adaptive instrumentation framework employs a further counter on the adaptive dispatch check and set of parameters, which includes a decrement, an interval, and a bound. This further counter controls when the sampling rate is decremented, and can be a count of the number of executions of the adaptive dispatch check in one implementation; or alternatively, a number of bursty traces sampled from the adaptive dispatch check (e.g., a number of nCheck counter resets), among other alternatives. The decrement determines how much to decrement the sampling rate (how much to increase the initialization value of the nCheck counter each time that it is reset). For example, in one implementation, the sampling rate is decremented by a factor of 10 each time the sampling rate is decreased, e.g., from 100%, 10%, 1%, 0.1%, etc. The interval determines how often to decrement the sampling rate. In one implementation, the sampling rate is decremented progressively less often. For example, the interval between decrements can be increased by a factor of 10 each time time the sampling rate is decremented, e.g., from an interval of 10 nCheck counter resets, to 100, 1000, 10,000, etc. The bound counter determines the lower bound of the sampling rate for the adaptive dispatch check.

In one implementation, adaptation of the sampling rate is then performed when the nCheck counter is reset. In one implementation beginning with a 100% sampling rate, nCheck is initially set to zero, resulting in dispatching to the instrumented code to sample a bursty trace. On a subsequent execution of the adaptive dispatch check after the bursty trace completes, the nCheck counter is reset, after first adapting (possibly decrementing) the sampling rate.

In adapting the sampling rate, the interval counter determines the interval at which the sampling rate is decremented. The interval counter is incremented at each nCheck counter reset, and causes a decrement each time its count reaches a pre-set limit. This interval progressively increases. For example, in one implementation, the interval limit is increased by a factor of 10 each time it is reached (i.e., the interval limit is increased by interval limit=10*interval limit, each time it is reached), so that decrements are performed at nCheck reset counts of 10, 100, 1000, 10,000, etc.

At each decrement of the sampling rate, the initialization value ($nCheck_0$) of the nCheck counter is increased so as to effect the decrement in the sampling rate (r). In one implementation, the value of nCheck is varied according to the formula $nCheck_0(n)=(decr^{n-1}-1)*nInstr0$, so $nCheck_0(1)=0$, $nCheck_0(2)=9*nInstr_0$, $nCheck_0(3)=99*nInstr_0$. With decr=10, then this formula yields: r(1)=100%, r(2)=10%, r(3)=1%. The decrement in the sampling rate continues until the lower bound of the sampling rate (e.g., 0.1% in one implementation) is reached.

For instance, in one embodiment, all dispatch checks can be sampled at a rate of 100% (i.e., full tracing) initially. Subsequent executions of the adaptive dispatch check then progressively reduce the sampling rate by an adjustable fractional amount until the adjustable or user-set lower bound sampling rate is reached. In the steady state, rarely executed code segments are virtually traced (sampled at close to 100%), while frequently executed code paths are sampled at the lower bound sampling rate. This approach trades the ability to distinguish frequently executed code paths from infrequently executed ones for more comprehensive code coverage.

The parameters of the adaptive dispatch checks can be adjusted in alternative implementations of the framework, so as to provide a different starting sampling rate, a different decrement size or factor, different interval of decrement progression, and a different lower bound, among others.

Figure 2:
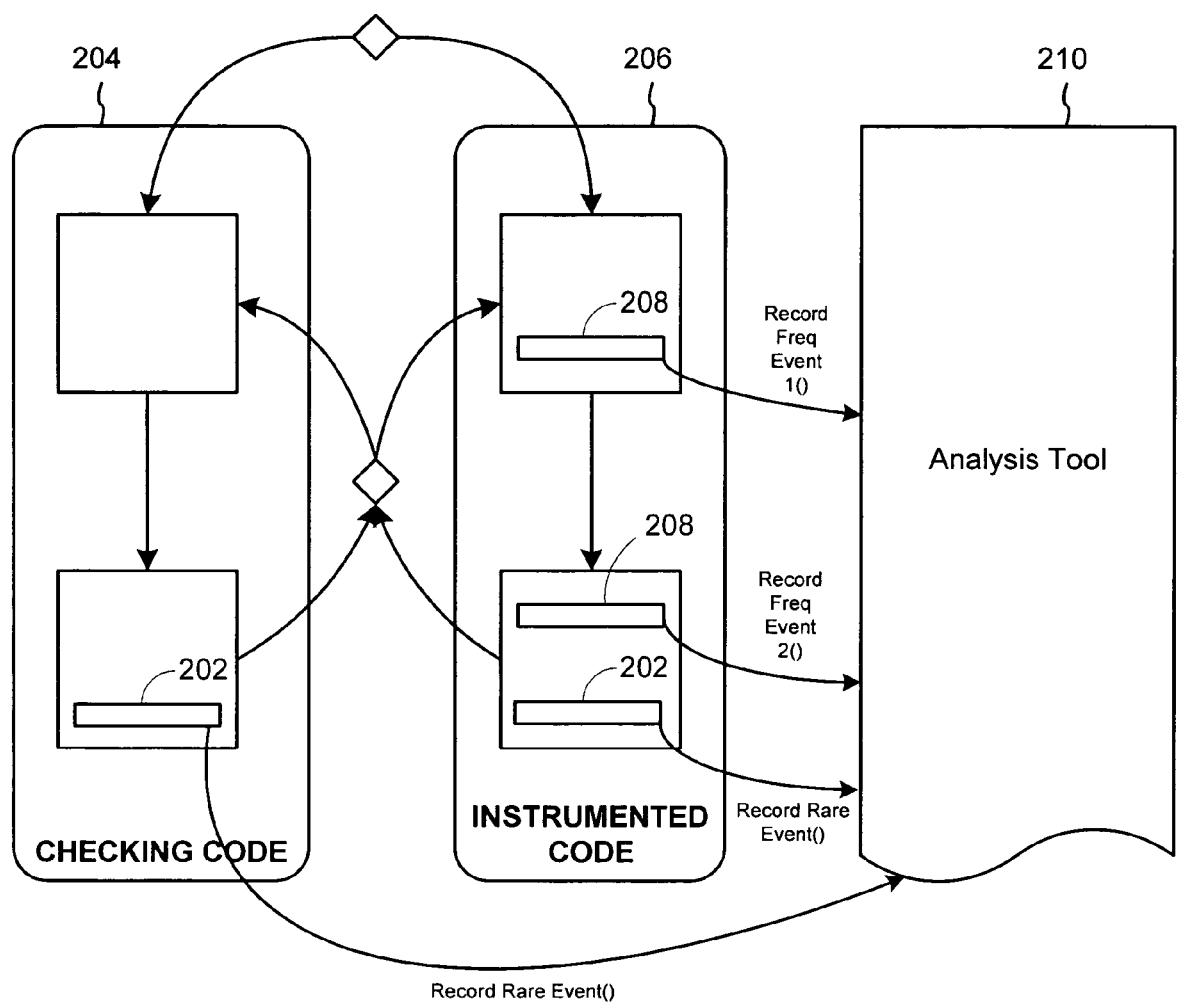
FIG. 2 is a framework for utilizing adaptive instrumentation in order to provide runtime monitoring and analysis.

Adaptive instrumentation can be used as a monitoring technique for plug-in tools that use the information to analyze the "correctness" of software, including but not limited to data races, memory leaks, and invariance. A framework for utilizing adaptive instrumentation in order to provide runtime monitoring and analysis is illustrated in FIG. 2. In one embodiment, infrequent program events, such as dynamic heap allocations and lock acquisitions, can be traced using conventional instrumentation. Such instrumentation 202 can therefore be placed directly into the checking code 204, as shown in FIG. 2, to provide runtime data on those events (Record Rare Event( )).

Frequent events that are too expensive to trace, such as data references, branch executions, memory allocations, synchronization events (locks, barriers, critical sections, semaphores), load and stores, branches, etc., can be monitored using adaptive instrumentation or bursty tracing. These events can be monitored by adding instrumentation points 208 to the instrumented code 206 (Record Freq Event 1/2 ( )). The instrumentation points 208 can be added at custom locations in the instrumented code or at each of the previously mentioned events. Once instrumentation points 208 are provided, plug-in code can simply be provided at the instrumentation points that are executed at each of the monitored event occurrences to provide runtime data to an analysis tool 210.

In one embodiment, a memory leak detection tool is provided that uses the disclosed monitoring techniques to detect memory leaks if a heap object has not been accessed for a "long" time. This simple invariant ensures that the tool detects all leaks that manifest at runtime. However, there are two significant obstacles to implementing this staleness policy within a practical memory leak tool. First, the overhead of monitoring all heap data accesses can be prohibitive. Second, the leaks reported could include a large number of "false positives". Perhaps for these reasons, no existing memory leak tool uses this "staleness" approach.

The tool of the current embodiment addresses the first problem by using adaptive instrumentation or bursty tracing techniques to monitor heap accesses with low overhead. For instance, in this embodiment, the tool can use a lower bound sampling rate of 0.1%, which may entail a runtime overhead of less than 5% in some instances. Regarding "false positives," tuning the "time elapsed" before an unaccessed heap object is reported as a leak is sufficient to remedy this problem. In addition, many of the remaining false positives are of interest to developers since objects that have not been accessed for a very long time often indicate inefficient use of memory. Sampling the heap data accesses appears to have no noticeable impact on the number of false positives. This may be so because most heap objects are accessed multiple times and the sampling will have to miss all of these accesses for an active object to be mistakenly classified as a leak.

Figure 3:
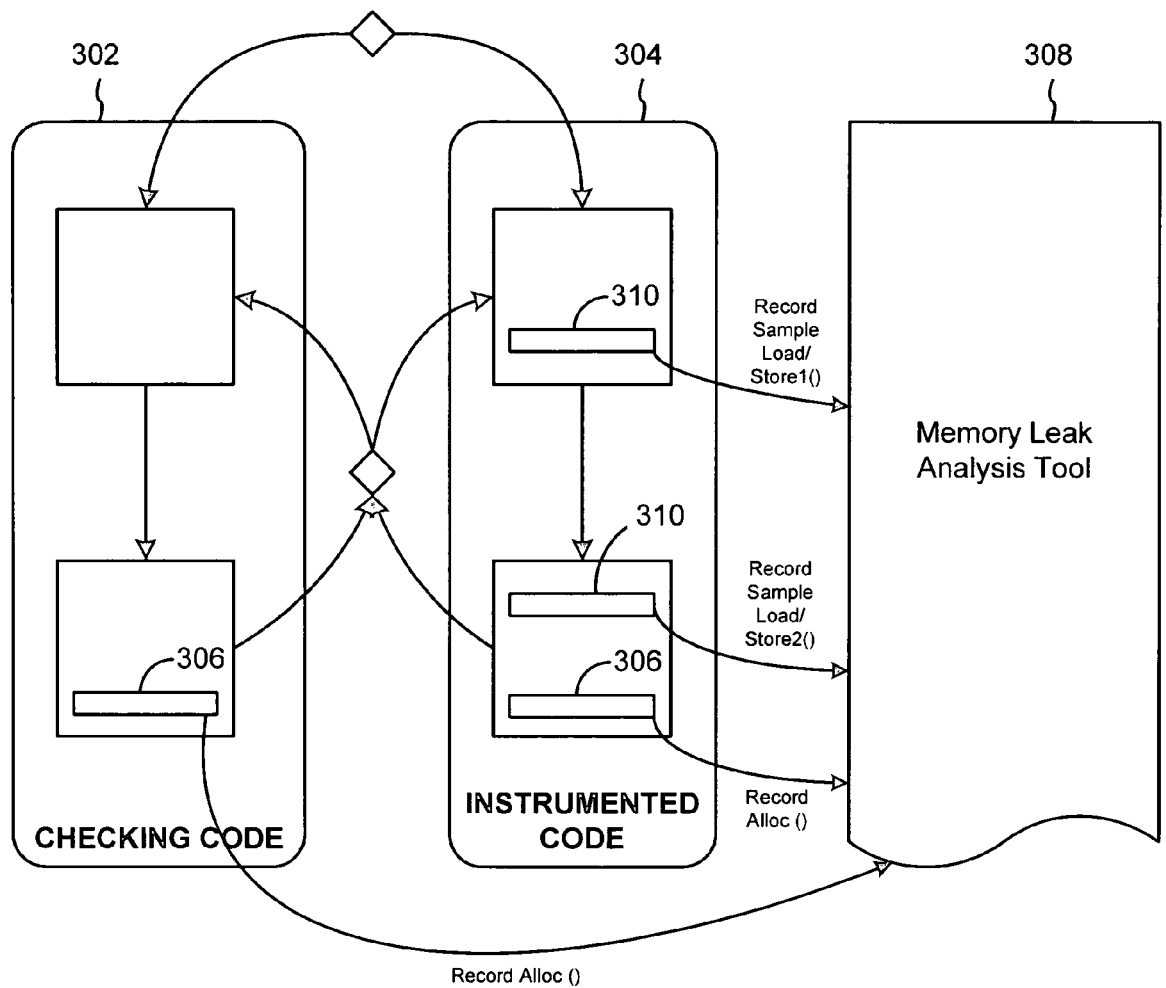
FIG. 3 is a block diagram of a memory leak detection tool implemented using the frame work of FIG. 2.

FIG. 3 is a block diagram of a memory leak detection tool implemented using the framework of FIG. 2. FIG. 3 shows checking code 302 and instrumented code 304. Checking code 302 includes instrumentation code 306 for providing information regarding memory heap allocations and frees to memory leak detection tool 308. Instrumentation code 306 includes instrumentation points where code can be inserted in order to provide event information. In this embodiment, the instrumentation points contain code 310 that provides sampled sets of heap accesses to memory leak detection tool 308.

Figure 4:
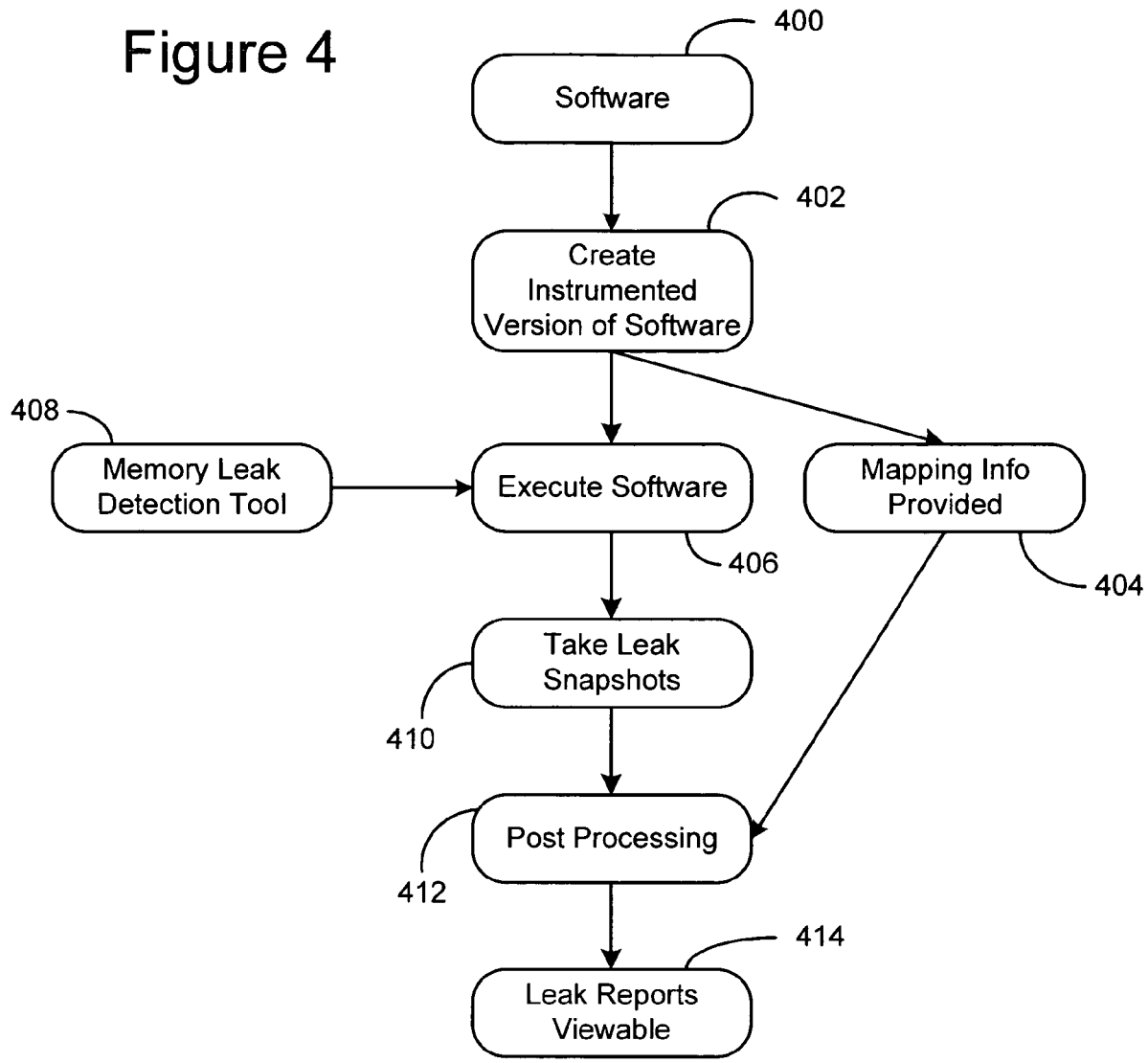
FIG. 4 shows a flowchart for one implementation of a memory leak detection tool.

FIG. 4 shows a flowchart for one implementation of a memory leak detection tool. An instrumented version of the software 400 is created at block 402. This instrumented version can be created using the adaptive instrumentation and bursty tracing techniques described previously. Additionally, mapping information 404, such as mapping a CPU instruction counter value at runtime to a line in source code, is also provided to facilitate "last access" information. The instrumented version is executed at block 406 in place of the original code along with a memory leak detection tool 408. The instrumented application can communicate event information, such as heap allocations and frees via instrumentation in the checked code, while a sampled set of heap accesses obtained via runtime monitoring using adaptive instrumentation or bursty tracing is provided to the memory leak detection tool 408 as previously described in FIG. 2.

The memory leak detection tool 408 uses the heap allocation and free information to maintain a model of the heap, which it updates with the heap access information. Periodically, the memory leak detection tool 408 takes a snapshot at block 410, where it visits all objects in its heap models and reports all objects that satisfy its staleness predicate as leaks. It is able to associate the responsible heap allocation, all heap frees that deallocated objects created at that allocation site, and most importantly the "last access", with each heap object reported as a leak. This last access information is invaluable for quickly debugging and fixing detected leaks. In addition, the last access information enables quick determination of "false positives". The leak snapshots are post processed at block 412 and leak reports can then be visualized through a user terminal at block 414. The user terminal can also include a source code browser that highlights a line of code in the program that is the last access to a leaked object.

A data race detection tool can also be implemented using the framework of FIG. 2. A data race occurs when an object is accessed by two different threads without explicit synchronization, which can cause unexpected behavior typically not evidenced until quite some time down-stream in the execution path. A data race detection tool works by tracking lock acquisitions and releases and refining its model of which locks protect which shared data by keeping track of the locks held by threads that access shared variables. Each shared variable has a lock-set that is constantly refined by intersecting it with the locks held by the thread making the current access. If the intersection is null, the tool reports a race. The tool must incur a high runtime overhead because it has to track all data accesses. By implementing a tool using the framework of FIG. 2, this overhead can be significantly reduced.

Figure 5:
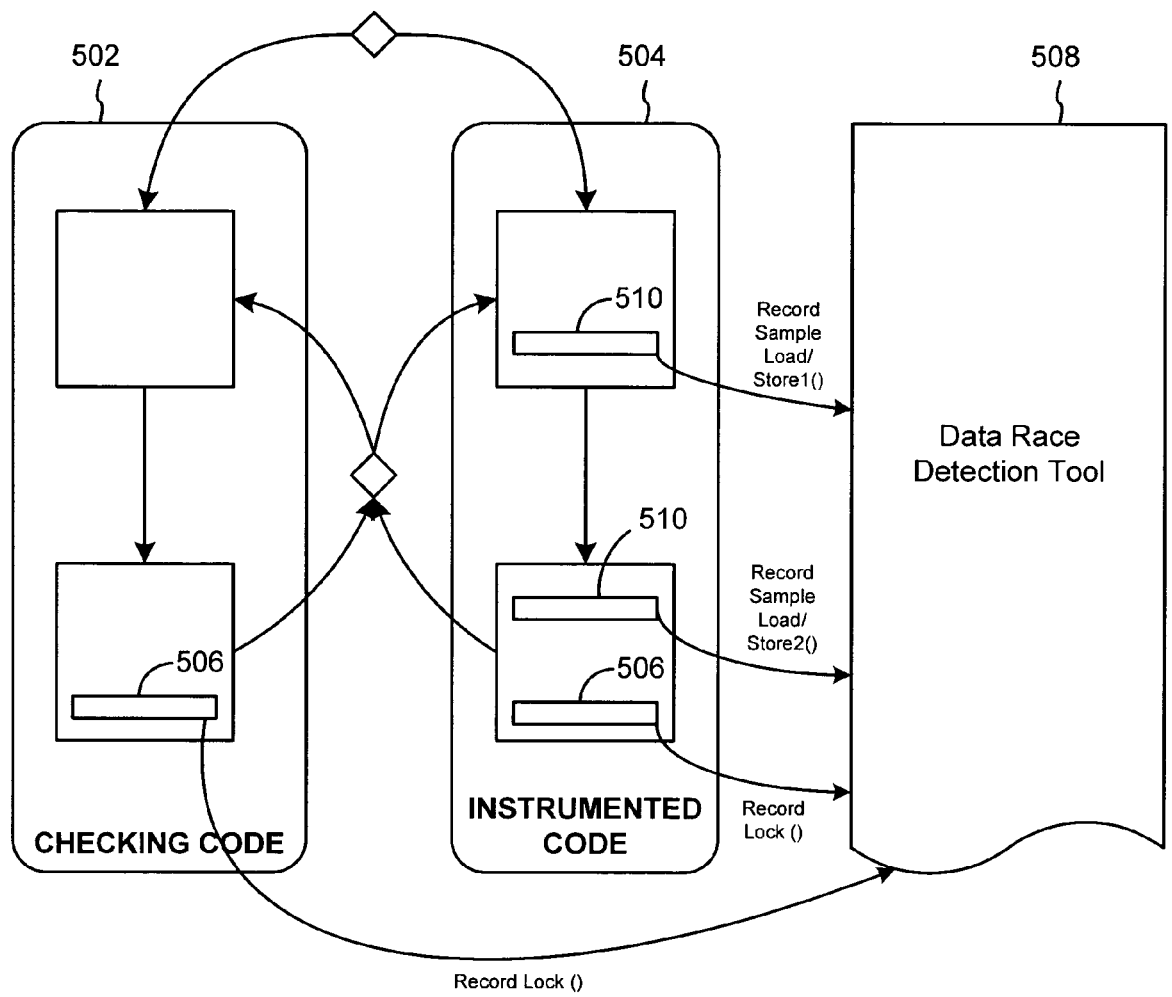
FIG. 5 is a block diagram of a data race detection tool implemented using the frame work of FIG. 2.

FIG. 5 is a block diagram of a data race detection tool implemented using the frame work of FIG. 2. FIG. 5 shows checking code 502 and instrumented code 504. Checking code 502 includes instrumentation code 506 for providing information regarding lock acquisitions and releases to data race detection tool 508. Instrumentation code 506 includes instrumentation points where code can be inserted in order to provide event information. In this embodiment, the instrumentation points contain code 510 that provides sampled sets of heap accesses to data race detection tool 508.

Figure 6:
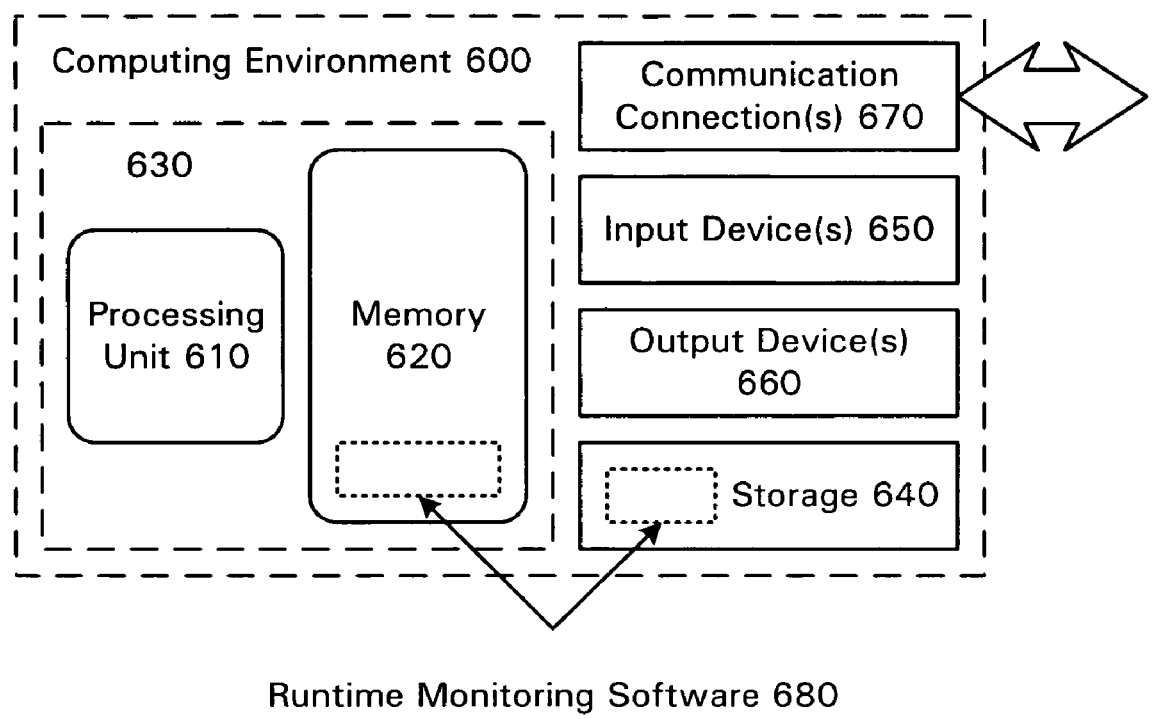
FIG. 6 illustrates a generalized example of a suitable computing environment 600 in which the described techniques can be implemented.

FIG. 6 illustrates a generalized example of a suitable computing environment 600 in which the described techniques can be implemented. The computing environment 600 is not intended to suggest any limitation as to scope of use or functionality of the invention, as the present invention may be implemented in diverse general-purpose or special-purpose computing environments.

With reference to FIG. 6, the computing environment 600 includes at least one processing unit 610 and memory 620. In FIG. 6, this most basic configuration 630 is included within a dashed line. The processing unit 610 executes computer-executable instructions and may be a real or a virtual processor. In a multi-processing system, multiple processing units execute computer-executable instructions to increase processing power. The memory 620 may be volatile memory (e.g., registers, cache, RAM), non-volatile memory (e.g., ROM, EEPROM, flash memory, etc.), or some combination of the two. The memory 620 stores software 680 implementing the software described herein.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other medium which can be used to store information and which can be accessed within the computing environment 600. The storage 640 stores instructions for adaptive instrumentation runtime monitoring and analysis software 680.

The input device(s) 650 may be a touch input device such as a keyboard, mouse, pen, or trackball, a voice input device, a scanning device, or another device that provides input to the computing environment 600. For audio, the input device(s) 650 may be a sound card or similar device that accepts audio input in analog or digital form, or a CD-ROM reader that provides audio samples to the computing environment. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The adaptive instrumentation runtime monitoring and analysis techniques herein can be described in the general context of computer-readable media. Computer-readable media are any available media that can be accessed within a computing environment. By way of example, and not limitation, with the computing environment 600, computer-readable media include memory 620, storage 640, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

Although the specific embodiments described herein referred to detection of memory leaks and data races, the invention is not so limited. For instance, a tool can be created using the disclosed techniques for checking invariance in code by simply altering the disclosed method to check array accesses versus array bounds in the instrumented versions of the original code.

We claim:

1. A method of instrumenting a program to provide instrumentation data for detecting memory leaks in the program, the method comprising:

creating an instrumented version of the program comprising duplicate versions of at least some code paths in the program, such that a duplicate code path has an original version code path and an instrumented version code path with instrumentation code for capturing instrumentation data;

tracking a frequency of execution of the code paths;

when a code path is to be executed, determining to dispatch execution into the instrumented version code path at a sampling rate for the respective code path and otherwise into the original version code path such that, for a given sampling rate, a ratio of a number of executions of the instrumented version code path to a total number of executions of both the instrumented version code path and the original version code path is equivalent to the given sampling rate;

adapting the sampling rate for the code paths according to the frequency of execution of the code paths, such that, after adapting, the ratio of a number of executions of the instrumented version code path to a total number of executions of the code path is equivalent to the adapted sampling rate, wherein the sampling rate for executing the code paths is adapted such that the adapted sampling rate is inversely related to the frequency of execution of the code paths;

storing instrumentation data obtained by execution of the instrumented version of the software; and reporting all objects that, according to the instrumentation data, satisfy a predefined staleness condition as memory leaks, wherein the predefined staleness condition comprises determining whether an object in the heap has been accessed within a predetermined length of time.

2. The method of claim 1 wherein instrumentation data comprises data relating to runtime data references, branch executions, memory allocations, synchronization events, data loads, data stores, or branches.

3. The method of claim 1 wherein instrumentation data comprises heap allocation, heap free, and heap access information.

4. The method of claim 1 wherein reporting all objects comprises reporting the heap object, responsible allocation, heap frees that deallocated objects created at that allocation site, and the last access to the leaked object.

5. The method of claim 4 wherein a source code browser highlights the last access to a leaked object.

6. A method for bursty tracing to detect memory leaks in software by adapting a sampling rate of executing instrumented procedures in the software during runtime, the method comprising:

creating an instrumented version of the software containing an original version and an instrumented copy version of each procedure in the software, wherein only one version of the each procedure will be executed each time when the each procedure is required to execute during the runtime;

executing the instrumented version of the software;

tracking frequency of execution of the procedures, wherein the instrumented copy version of the procedures are sampled at rates adjusted to be inversely related to the frequency of execution of the procedures, including:

sampling at higher rates for the procedures whose total number of executions of both the original versions and the copy versions are executed less frequently, and sampling at lower rates for procedures whose total number of execution of both the original versions and the copy versions are executed more frequently, wherein the sampling rate for a given procedure comprises a number of executions of the instrumented version of the procedure taken as percentage of total number of executions of both versions of the procedure;

storing instrumentation data obtained by execution of the instrumented version of the software; and reporting all objects that satisfy a predefined staleness condition as memory leaks, wherein the predefined staleness condition comprises determining whether an object in the heap has been accessed within a predetermined length of time.

7. The method of claim 6 wherein instrumentation data comprises heap allocation, heap free and heap access information.

8. The method of claim 6 wherein reporting all objects comprises reporting the heap object, responsible allocation, heap frees that deallocated objects created at that allocation site, and the last access to the leaked object.

9. The method of claim 8 wherein a source code browser highlights the last access to a leaked object.

10. A method of instrumenting a program to provide instrumentation data for detecting data races in the program, the method comprising:

creating an instrumented version of the program comprising duplicate versions of at least some code paths in the program, such that a duplicate code path has an original version code path and an instrumented version code path with instrumentation code for capturing instrumentation data;

tracking a frequency of execution of the code paths;

when a code path is to be executed, determining to dispatch execution into the instrumented version code path at a sampling rate for the respective code path and otherwise into the original version code path such that, for a given sampling rate, a ratio of a number of executions of the instrumented version code path to a total number of executions of both the instrumented version code path and the original version code path is equivalent to the given sampling rate; and adapting the sampling rate for the code paths according to the frequency of execution of the code paths, such that, after adapting, the ratio of a number of executions of the instrumented version code path to a total number of executions of the code path is equivalent to the adapted sampling rate, wherein the sampling rate for executing the code paths are adapted at a rate inversely related to the frequency of execution of the code paths;

storing instrumentation data obtained by execution of the instrumented version of the software; and reporting variables, that, according to the instrumentation data, satisfy a predefined data race condition based on lock acquisitions and releases for the variables.

11. The method of claim 10, wherein instrumentation data comprises sets of locks for variables in the software and sets of locks held by threads which access shared variables.

12. The method of claim 11, wherein storing instrumentation data comprises, when a thread accesses a shared variable, refining a set of locks for the variable by intersecting it with a set of locks for the thread.

13. The method of claim 12, wherein the predefined data race condition comprises determining, when an intersection is made between a set of locks for a variable and a set of locks for a thread, whether the intersection is null.

14. The method of claim 12, wherein the predefined data race condition comprises determining, when an intersection is made between a set of locks for a variable and a set of locks for a thread, whether the intersection is null.

15. The method of claim 11, wherein storing instrumentation data comprises, when a thread accesses a shared variable, refining a set of locks for the variable by intersecting it with a set of locks for the thread.

16. The method of claim 10, wherein instrumentation data comprises sets of locks for variables in the software and sets of locks held by threads which access shared variables.

17. A method for bursty tracing to detect data races in software by adapting a sampling rate of executing instrumented procedures in the software during runtime, the method comprising:

creating an instrumented version of the software containing an original version and an instrumented copy version of each procedure in the software, wherein only one version of the each procedure will be executed each time when the each procedure is required to execute during the runtime;

executing the instrumented version of the software;

tracking frequency of execution of the procedures, wherein the instrumented copy version of the procedures are sampled at rates adjusted to be inversely related to the frequency of execution of the procedures, including: sampling at higher rates for the procedures whose total number of executions of both the original versions and the copy versions are executed less frequently, and sampling at lower rates for procedures whose total number of execution of both the original versions and the copy versions are executed more frequently, wherein the sampling rate for a given procedure comprises a number of executions of the instrumented version of the procedure taken as percentage of total number of executions of both versions of the procedure;

storing instrumentation data obtained by execution of the instrumented version of the software; and reporting variables that, according to the instrumentation data, satisfy a predefined data race condition based on lock acquisitions and releases for the variables.

18. A method of instrumenting a program to provide instrumentation data for checking correctness of memory accesses in the program, the method comprising:

creating an instrumented version of the program comprising duplicate versions of at least some code paths in the program, such that a duplicate code path has an original version code path and an instrumented version code path with instrumentation code for capturing instrumentation data;

tracking a frequency of execution of the code paths;

when a code path is to be executed, determining to dispatch execution into the instrumented version code path at a sampling rate for the respective code path and otherwise into the original version code path such that, for a given sampling rate, a ratio of a number of executions of the instrumented version code path to a total number of executions of both the instrumented version code path and the original version code path is equivalent to the given sampling rate; and adapting the sampling rate for the code paths according to the frequency of execution of the code paths, such that, after adapting, the ratio of a number of executions of the instrumented version code path to a total number of executions of the code path is equivalent to the adapted sampling rate, wherein the sampling rate for executing the code paths are adapted at a rate inversely related to the frequency of execution of the code paths;

storing instrumentation data obtained by execution of the instrumented version of the software; and reporting memory accesses, that, according to the instrumentation data, access memory locations incorrectly.

19. The method of claim 18, wherein reporting memory accesses comprises reporting checking invariance in the software.

20. The method of claim 19, wherein the instrumentation data comprises array accesses.

21. The method of claim 20, wherein checking invariance comprises checking the array accesses against array bounds.

22. A method for bursty tracing to detect incorrect memory accesses in software by adapting a sampling rate of executing instrumented procedures in the software during runtime, the method comprising:

creating an instrumented version of the software containing an original version and an instrumented copy version of each procedure in the software, wherein only one version of the each procedure will be executed each time when the each procedure is required to execute during the runtime;

executing the instrumented version of the software;

tracking frequency of execution of the procedures, wherein the instrumented copy version of the procedures are sampled at rates adjusted to be inversely related to the frequency of execution of the procedures, including: sampling at higher rates for the procedures whose total number of executions of both the original versions and the copy versions are executed less frequently, and sampling at lower rates for procedures whose total number of execution of both the original versions and the copy versions are executed more frequently, wherein the sampling rate for a given procedure comprises a number of executions of the instrumented version of the procedure taken as percentage of total number of executions of both versions of the procedure;

storing instrumentation data obtained by execution of the instrumented version of the software; and reporting memory accesses, that, according to the instrumentation data, access memory locations incorrectly.

23. The method of claim 22, wherein reporting memory accesses comprises reporting checking invariance in the software.

24. The method of claim 23, wherein the instrumentation data comprises array accesses.

25. The method of claim 24, wherein checking invariance comprises checking the array accesses against array bounds.

* * * * *

UNITED STATES PATENT AND TRADEMARK OFFICE
CERTIFICATE OF CORRECTION

PATENT NO. : 7,587,709 B2  Page 1 of 1
APPLICATION NO. : 10/693834
DATED : September 8, 2009
INVENTOR(S) : Chilimbi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 769 days.

Signed and Sealed this

Twenty-first Day of September, 2010

David J. Kappos
*Director of the United States Patent and Trademark Office*